United States Patent [19]

Mercier et al.

[11] 3,990,570
[45] Nov. 9, 1976

[54] APPARATUS FOR SUPPORTING THE EDGES OF A WINDOW

[75] Inventors: Alain Mercier, Courbevoie; Yves Fournier, Chalon-sur-Saone, both of France

[73] Assignee: Saint-Gobain Industries, Neuilly-sur-Seine, France

[22] Filed: Oct. 9, 1975

[21] Appl. No.: 621,025

[30] Foreign Application Priority Data
Oct. 11, 1974 France .............................. 74.34334

[52] U.S. Cl. ............................... 198/782; 156/107; 156/350; 193/35 SS; 198/783; 271/265; 271/267
[51] Int. Cl.² ....................................... B65G 25/00
[58] Field of Search ................. 198/107, 160, 218; 193/35 SS, 35 R; 156/107, 350; 271/264, 265, 267–269; 214/1 S; 104/134, 135, 162, 176

[56] References Cited
UNITED STATES PATENTS

| | | |
|---|---|---|
| 3,252,563 | 5/1966 | Juengel .............................. 198/160 |
| 3,312,330 | 4/1967 | Juengel .............................. 198/81 |
| 3,473,988 | 10/1969 | Rullier et al. ...................... 156/107 |
| 3,876,489 | 4/1975 | Chenel ............................... 156/107 |

*Primary Examiner*—John J. Love
*Assistant Examiner*—Jeffrey V. Nase
*Attorney, Agent, or Firm*—Pennie & Edmonds

[57] ABSTRACT

Apparatus for supporting a window being moved parallel to a pair of opposite edges thereof, particularly a double-pane window having fresh sealant coated along its leading and trailing edges, comprises two sets of rollers spaced apart laterally beneath the window with the rollers of each set longitudinally spaced in the path of travel of the window. Detectors responsive to the leading and trailing edges of the window selectively actuate the rollers to their respective upper positions after passage of a leading edge of the window thereby, and to respective lower positions prior to passage of a trailing edge thereby. This avoids soiling the rollers by the fresh sealant, with consequent soiling of subsequent windows. The windows may be supported midway of its side edges by a moving carriage, and guides for the side edges may be provided. Upstream and downstream detectors for each roller are described, particularly pneumatic detectors with an AND cell for controlling actuation of a roller.

8 Claims, 3 Drawing Figures

APPARATUS FOR SUPPORTING THE EDGES OF A WINDOW

The present invention pertains to apparatus for supporting the lateral edges of a window. The apparatus is particularly adapted, although not limited, to use in fabricating multiple-pane windows wherein sheets of glass or panes are provided at their edges with a coating of mastic, as by injection.

Multiple-pane windows are well-known in which two or more panes of glass are separated from each other by a closed air space and include at their periphery a first or inner filament of plastic material such as polyisobutylene. This seal must be covered with an outer plastic of a second material such as an elastomer of silicone or of a polysulfide introduced by injection between the inner filament and the edges of the glass panes beyond which edges the second material may extend. Formation of this second joint is customarily effected by moving an injection nozzle with respect to the edges on the four sides of the double or plural pane window. The nozzle may itself move or, as is more frequently the case, the nozzle is fixed and the glass sheets are moved with respect to it.

As described in our copending application Ser. No. 621,026, filed concurrently herewith and entitled "METHOD AND APPARATUS FOR SIMULTANEOUSLY SEALING TWO EDGES OF A MULTIPLE PANE WINDOW", the customary method of fabrication is limited as to speed. To overcome this disadvantage it is proposed in this copending application to inject the outer sealant of polysulfide or other material simultaneously along two parallel opposite edges of the multiple pane window. Apparatus for doing this includes a carriage movable along rails fixed to the frame of the machine. This carriage is equipped with a suction cup connected to a vacuum line and holds in horizontal position the multiple pane window to be worked upon. The window is moved by travel of the carriage along its rails. During this movement of the carriage, the opposite edges of the window pass before separate injection nozzles, each one being disposed at the end of a rigid rod and the two rods being capable of being separated or brought together symmetrically with respect to the longitudinal axis of the carriage travel. These rods are brought into spaced position to permit placement of a multiple pane window between them on a support and then are brought together so as to contact the opposite edges of the window to thereby center it and to maintain it in proper position with respect to the injection nozzles during the injection operation. Once this operation is terminated, another carrying device grasps the window to move it to the next operating station.

This suction cup support is entirely suitable for the transport of windows of small dimensions of which the leading and trailing edge have been provided with the plastic. The centrally disposed suction cup carries the window exactly at its center so that the suction cup is never in contact with the opposite edges already provided with plastic and there is no risk of soiling the carrier with fresh plastic.

However, as soon as the dimensions of the window become large, and if it is supported only by a central suction cup, the edges thereof bend due to the weight of the glass.

One might conceive of a carrier of known type including rollers or belts for carrying and transporting the window at the proper height so as to overcome this shortcoming. This is unfortunately not satisfactory since any carrier which in one way or another comes into contact with the two edges which have been freshly coated with sealing material would be immediately soiled by that material since it has not yet hardened or polymerized. The result would be, after the passage of one window whose edges were so coated, to soil the surfaces of the following windows upon their coming into contact with the carrier.

The present invention has for an object to surmount this shortcoming by providing supporting means for two parallel edges of the window which will not be soiled by leading and trailing edges which have been coated with sealing materials.

Apparatus of the invention preferably includes two parallel members which, by a suitable drive and control device, can be displaced parallel to each other so as to bring centering elements carried by them against the two parallel edges of the window to be supported, and alternatively to displace those centering members from each other. This apparatus is characterized by the fact that each of the members is provided with a framework on which a plurality of levers are mounted to pivot about a horizontal axis. Each of these levers carries a roller which rotates about a horizontal axis and each lever is coupled to a drive mechanism adapted to shift the lever to an upper position corresponding to contact of the lower surface of the window with the upper surface of the roller, and to a lower position in which the roller is out of contact with the window. Each of the separate driving devices for these levers is responsive to a means for detecting the passage of the leading and trailing edges of the window as it travels thereby.

In a preferred embodiment the detecting means includes a downstream detector which upon passage of the leading edge of the window effects displacement of the lever of the associated roller into contact with the window. The detecting means also includes an upstream detector which upon passage of the trailing edge of the window causes the lever to be shifted downwardly.

The detectors may be of pneumatic type, each including an air jet transmitter and a receiver disposed along a common axis above and below the plane of the window. With the support means of the invention disposed downstream of the coating station where the leading and trailing edges of the window have been coated, the support means will not be soiled by the fresh coatings applied to those edges, since the support rollers will not contact the window until after the passage of the leading edge and will be withdrawn before arrival of the trailing edge.

The invention will now be further described in terms of a presently preferred embodiment thereof, by reference to the accompanying drawings, in which.

DESCRIPTION OF THE PREFERRED EMBODIMENT

Figure 1:
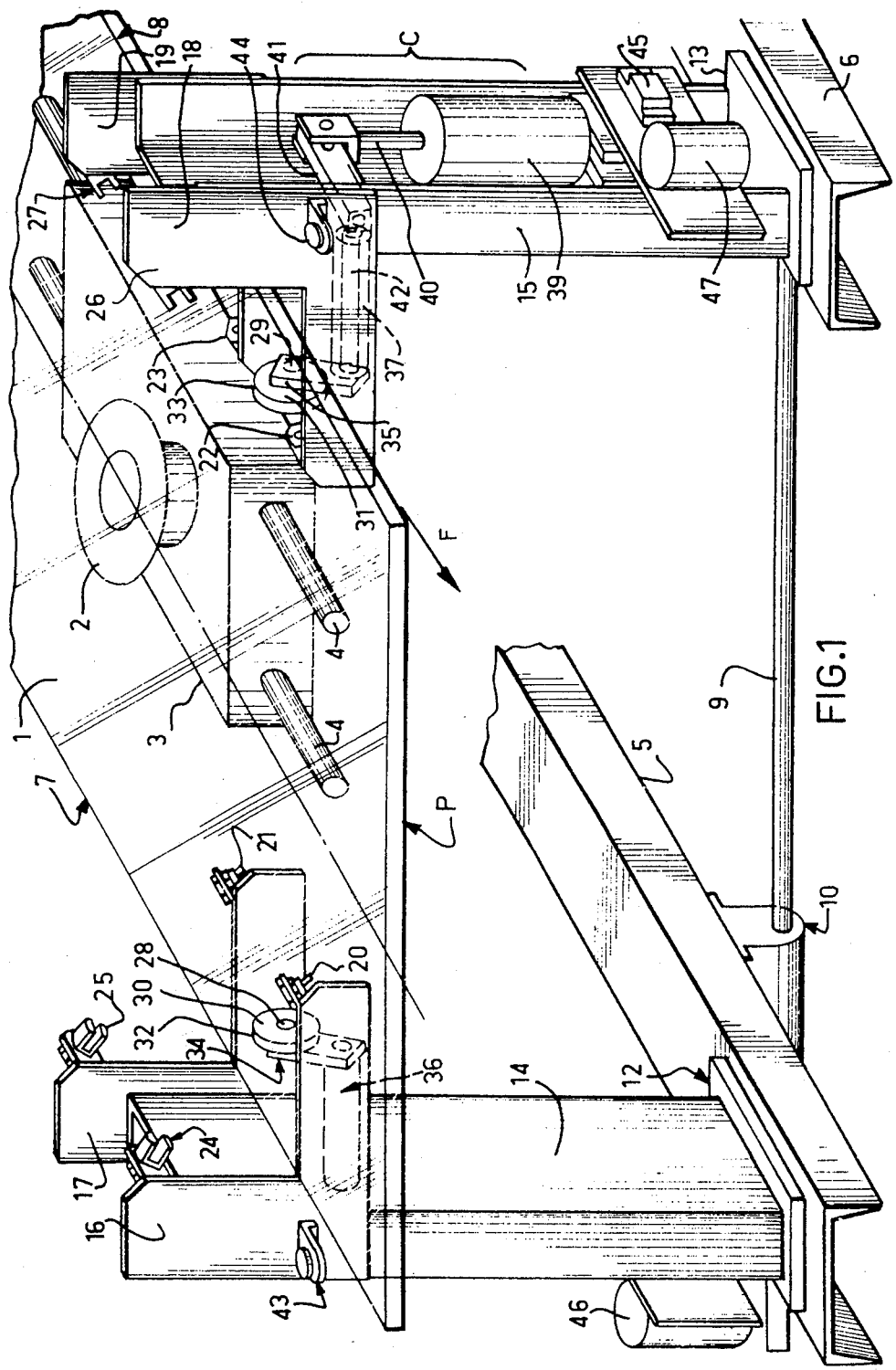
FIG. 1 is a perspective view of a portion of a coating mechanism equipped with window carrier transport mechanism according to the invention.
Figure 3:
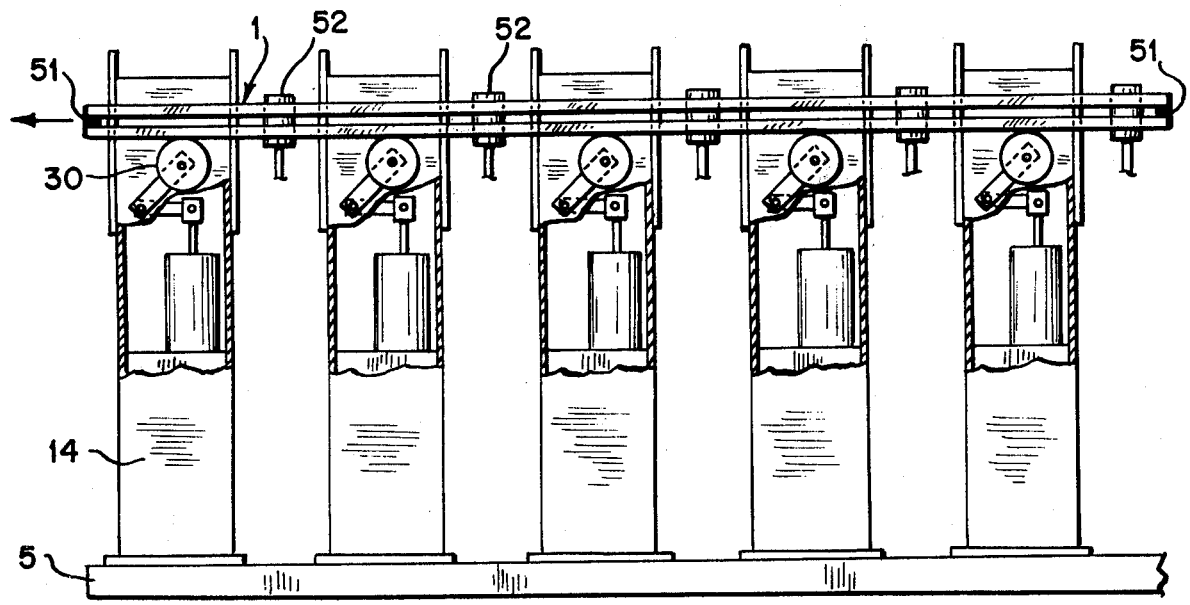
FIG. 3 is a side view showing a plurality of rollers for supporting an edge of the window.

In FIG. 1, a window shown as glass pane 1 is carried by a carriage 3 with the aid of a central suction cup 2. The carriage moves on fixed rails 4 suitably mounted on a frame (not shown). Usually the window will be multiple pane, as shown in FIG. 3. The carriage 3 receives the window after the leading and trailing edges have been coated with sealing material at a prior working station, and travels along the rails 4 between the centering members 5 and 6. For clarity of the drawings, only portions of the centering members are here shown. The centering members move parallel to themselves and symmetrically toward and away from each other with respect to the longitudinal axis of the apparatus so as to bring supports mounted thereon against the opposite edges 7 and 8 of the window. This is described in detail in the copending application above identified.

The control mechanism for displacement of the bars 5 and 6 has not been shown except as to one of the rails 9 along which the bearings 10 of the bars slide.

By means of plates 12 and 13, pillars 14 and 15 are fixed to the bars 5 and 6. These pillars have U-shaped cross-sections. Several pillars are mounted on each bar as shown in FIG. 3, but only two are here shown in detail.

Each of these pillars carries at its upper end two angle plates indicated at 16 and 17 for pillar 14 and at 18 and 19 for the pillar 15, each having a right angle projection. These projections are provided with jet nozzles 20, 21, 22, 23 and the plates mount pneumatic receivers 24, 25, 26, 27 whose function will be described below.

The pillars 14 and 15 carry rollers 30 and 31, respectively. The rollers are rotatable about horizontal axes and the upper edges thereof indicated at 32 and 33 are in the same horizontal plane P as the lower surface of the window 1 when the rollers are in their raised positions.

Each of the horizontal axes 28, 29 of the rollers 30, 31 is carried on a lever arm 34, 35 which rotates between upper and lower positions about supports 36, 37. the control device C for each of the levers 34, 35 takes the form of a pneumatic piston whose cylinder is fixed to the respective pillar. For clarity in the drawing, only one of these devices C and one cylinder 39 has been shown. The piston rod 40 of cylinder 39 operates lever 41 on the pivot shaft 42 to which lever 35 is affixed. The shaft 42 is supported by support 37.

These cylinders such as cylinder 39 are controlled by signals derived from pneumatic detectors such as identified by the reference characters 22, 26 and 23, 27 disposed on opposite sides of each of the rollers with respect to the direction of glass motion. These signals are amplified at 44, 44' (see FIG. 2). They are delivered to an AND cell 45 which operates a valve 47 for control of the flow of hydraulic fluid under pressure to the piston 39, and similarly for the control means of the roller lever 34 on the opposite side of the apparatus.

Although only two columns 14 and 15 have been shown with their associated rollers and control devices, each of the members 5 and 6 includes a plurality of such assemblies, each with its roller and its supporting pillar, as shown in FIG. 3.

Figure 2:
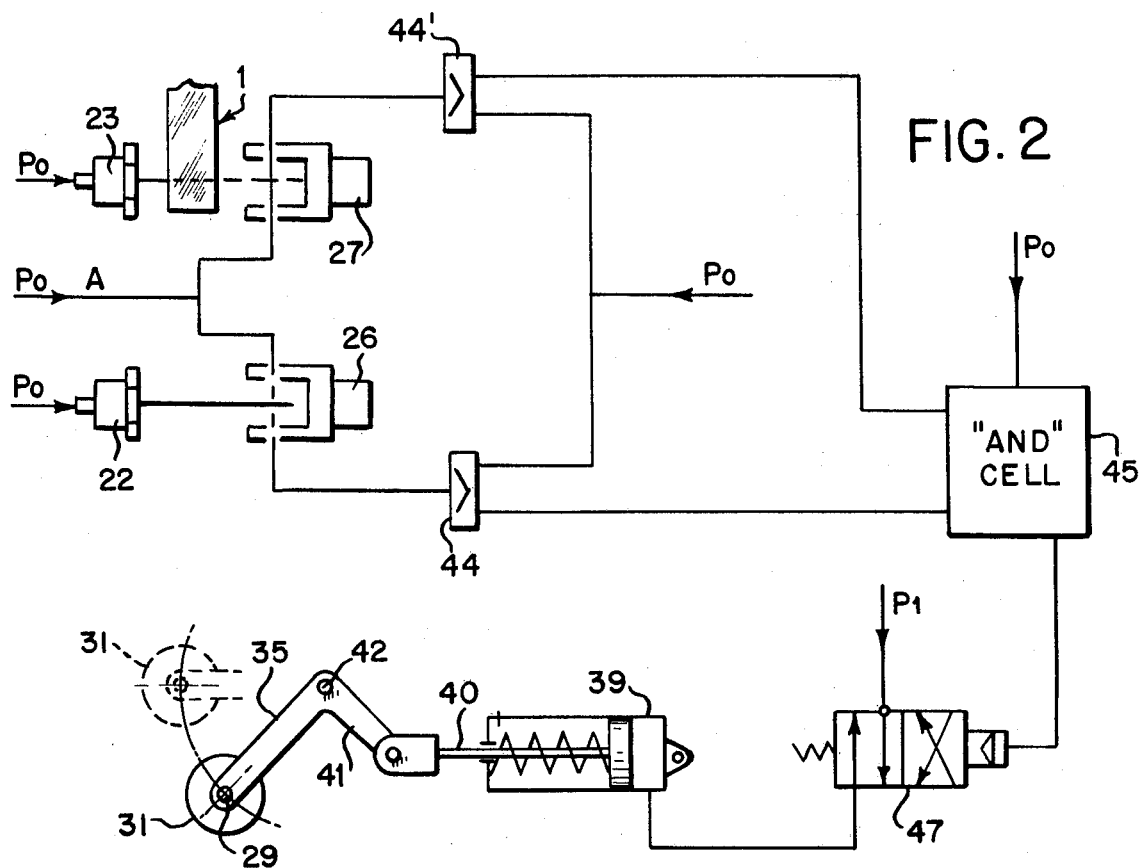
FIG. 2 is a diagram of the apparatus for electropneumatic control of the window carrying rollers.

The circuit for control of a roller is shown in FIG. 2. It is there seen that since the pneumatic emitting nozzles 22 and 23 and the respective receivers 26 and 27 are disposed on opposite sides of the plane of passage of the window 1, the jets of air delivered by the nozzles 22 and 23 will be interrupted when the window passes between them and their receivers.

When the window moves in the direction indicated by the arrow F in FIG. 1, its leading edge will first interrupt the jet of air from nozzle 23. This permits passage of air A from the receiver 27 to amplifier 44' and thence to the AND cell 45. Cell 45 is of the type which deliver an output signal only when both input signals are supplied thereto. Accordingly, since the condition of the sensor 26 is unchanged, cell 45 remains unchanged and the roller 31 remains in its lower position. In consequence, the leading edge of the window advances without soiling the roller 31 with the unpolymerized material on the leading edge of the window.

The window then comes into position where its leading edge interrupts the jet of air delivered from nozzle 22. This permits passage of air A from receiver 26 to the amplifier 44 and thence to the cell 45. Cell 45 now receives signals from both receivers 26 and 27. Accordingly it delivers an output signal to valve 47 and opens the valve so as to permit flow of hydraulic fluid to cylinder 39. Consequently, the roller 31 rises to the upper position shown in dash lines FIG. 2.

In this position, the roller supports the window 1 until the time when the trailing edge thereof arrives at the axis of sensor 23, 27. The jet path is then reestablished and the signal from amplifier 44' to AND cell 45 is removed. The output signal from cell 45 is removed and roller 31 is lowered. Thus the roller is out of contact with the window when its trailing edge passes, so that the roller is not soiled.

The components of the pneumatic control system of FIG. 2 may be of known design, so that further detailed description thereof is unnecessary.

As has already been stated, the bars 5 and 6 include a plurality of rollers. This is shown in FIG. 3 where a plurality of columns 14 and their associated rollers 30 are arranged along bar 5. Rollers 30 form a set of rollers spaced longitudinally of the path of the window 1. The window is here shown as a double-pane window with sealing material 51 at the leading and trailing edges thereof. Rollers 52 may be arranged along the edge of the window for guiding, if desired. A similar set of rollers and columns is located at the opposite edge of the window, as will be clear from FIG. 1.

With a plurality of rollers in each set, lowering of two rollers opposite each other such as the downstream rollers 30 and 31 does not leave the window without support along its edges, since the window continues to be supported by rollers which are still in their upper position.

While the operation has been described with particular reference to roller 31, it is the same for roller 30 and the others. In particular, as the leading edge of the window passes the longitudinally spaced rollers in succession, they will be raised in succession, and as the trailing edge approaches the rollers in succession, they will be lowered in succession.

As will be understood from the foregoing, the present invention is directed to apparatus for supporting a window being moved parallel to a pair of opposite edges thereof which comprises frame means for supporting two sets for rollers beneath the window, the sets of rollers being spaced apart laterally of the wndow and the rollers of each set being spaced longitudinally of the path of travel of the wndow, the rollers being mounted for movement to respective upper positions for supporting contact with the window and to respective lower positions for non-contact with the window, detector means for detecting the passage by the rollers of the leading and trailing edges of the window, and control means responsive to the detector means for selectively actuating the rollers to the respective upper positions thereof after passage of a said leading edge thereby and to the respective lower positions thereof prior to the passage of a said trailing edge thereby.

Preferably carriage means are provided for supporting the window at a region midway between the opposite edges thereof and moving the window past the rollers, the sets of rollers being located adjacent and beneath the opposite edges. Guide means may be provided for guiding the opposite edges of the window in parallel relationship with the sets of rollers. Advantageously the frame means includes separate frames for supporting the sets of rollers respectively, and means mounting the frames for movement toward and away from each other in parallel relationship to center the window with respect to the sets of rollers. The rollers may be mounted on respective levers, the control means being coupled to respective levers to selectively actuate the levers to move the rollers to upper and lower positions thereof.

Advantageously the detector means includes downstream and upstream detectors for predetermined longitudinally spaced rollers, the control means being responsive to the passage of a leading edge of the window past a downstream, detector to move the corresponding roller to its upper position, and to the passage of a trailing edge past an upstream detector to move the roller to its lower position. The detectors may be pneumatically operated, each detector including a jet nozzle and a receiver therefor placed on a common axis above and below the window. Advantageously an AND cell is provided for receiving the outputs of the receivers of each pair of upstream and downstream detectors and producing an output for actuating the corresponding roller to its upper position when the jets to both receivers are interrupted by the window, and actuating the roller to its lower position when either or both of the jets are not interrupted.

We claim:

1. Apparatus for supporting a window being moved parallel to a pair of opposite edges thereof which comprises
    a. frame means for supporting two sets of rollers beneath the window,
    b. said sets of rollers being spaced apart laterally of the window and the rollers of each set being spaced longitudinally of the path of travel of the window,
    c. said rollers being mounted for movement to respective upper positions for supporting contact with the window and to respective lower positions for non-contact with the window,
    d. detector means for detecting the passage by said rollers of the leading and trailing edges of the window,
    e. and control means responsive to said detector means for selectively actuating said rollers to the respective upper positions thereof after passage of a said leading edge thereby and to the respective lower positions thereof prior to the passage of a said trailing edge thereby.

2. Apparatus according to claim 1 including carriage means for supporting the window at a region midway between said opposite edges thereof and moving the window past said rollers, said sets of rollers being located adjacent and beneath said opposite edges.

3. Apparatus according to claim 1 including guide means for guiding said opposite edges of the window in parallel relationship with said sets of rollers.

4. Apparatus according to claim 1 in which said rollers are mounted on respective levers, said control means being coupled to respective levers to selectively actuate the levers to move said rollers to upper and lower positions thereof.

5. Apparatus according to claim 1 in which said frame means includes separate frames for supporting said sets of rollers respectively, and means mounting said frames for movement toward and away from each other in parallel relationship to center said window with respect to said sets of rollers.

6. Apparatus according to claim 1 in which said detector means includes downstream and upstream detectors for predetermined longitudinally spaced rollers, said control means being responsive to the passage of a said leading edge past a downstream detector to move the corresponding roller to its upper position and to the passage of a said trailing edge past an upstream detector to move the corresponding roller to its lower position.

7. Apparatus according to claim 6 in which said detectors are pneumatically operated detectors, each detector including a jet nozzle and a receiver therefor placed on a common axis above and below the window.

8. Apparatus according to claim 7 including an AND cell for receiving the outputs of the receivers of each pair of upstream and downstream detectors and producing an output for actuating the corresponding roller to its upper position when the jets to both receivers are interrupted by said window and actuating the roller to its lower position when either or both of the jets are not interrupted.

* * * * *